United States Patent
Bernini

(10) Patent No.: US 6,446,463 B2
(45) Date of Patent: Sep. 10, 2002

(54) FILTER CARTRIDGE AND CONDENSER

(75) Inventor: Michele Bernini, Scarzara (Parma) (IT)

(73) Assignee: S.K.G. Italiana S.p.A., Scarzara (Parma) (IT)

(*) Notice: Subject to any disclaimer, the term of this patent is extended or adjusted under 35 U.S.C. 154(b) by 0 days.

(21) Appl. No.: 09/802,063

(22) Filed: Mar. 8, 2001

(30) Foreign Application Priority Data

Mar. 9, 2000 (DE) .......................... 200 04 438
Nov. 10, 2000 (EP) ............................ 00124652

(51) Int. Cl.[7] .............................................. F25B 43/02
(52) U.S. Cl. ........................................... 62/473; 62/509
(58) Field of Search .................... 62/473, 474, 509, 62/512; 165/110

(56) References Cited

U.S. PATENT DOCUMENTS

| | | | |
|---|---|---|---|
| 5,419,141 A | 5/1995 | Burk | 62/474 |
| 5,456,089 A * | 10/1995 | O'Brien | 165/149 |
| 5,487,279 A * | 1/1996 | Eybergen et al. | 165/134.1 |
| 5,537,839 A * | 7/1996 | Burk et al. | 165/132 |
| 5,666,791 A | 9/1997 | Burk | 62/474 |
| 5,792,425 A * | 8/1998 | Clark et al. | 422/101 |
| 5,992,174 A | 11/1999 | Mittelstrass | 62/474 |
| 6,223,556 B1 * | 5/2001 | De Keuster et al. | 165/132 |
| 6,260,379 B1 * | 7/2001 | Manwill et al. | 62/474 |

FOREIGN PATENT DOCUMENTS

| | | | |
|---|---|---|---|
| EP | 0669506 A1 | 8/1995 | |
| EP | 0854058 | 7/1998 | |
| FR | 2750761 | 1/1998 | |
| JP | 402139089 A * | 5/1990 | 204/665 |
| JP | 09324962 | 12/1997 | |

\* cited by examiner

Primary Examiner—William E. Tapolcai
Assistant Examiner—Mohammad M. Ali
(74) Attorney, Agent, or Firm—Armstrong, Westerman & Hattori, LLP

(57) ABSTRACT

A filter cartridge F in a condenser K for an automobile air-conditioning system comprises a permeable housing 1 containing a desiccant charge, said housing being inserted into a header pipe 8 of said condenser which header pipe is closed by a plug S being part of said filter cartridge F. In a condenser K being equipped with a filter cartridge F in header tube 8 which is closed by a plug S said is made from plastic material or light metal and is part of said filter cartridge F to fulfil a function, namely to seal the header tube and to position the cartridge.

17 Claims, 4 Drawing Sheets

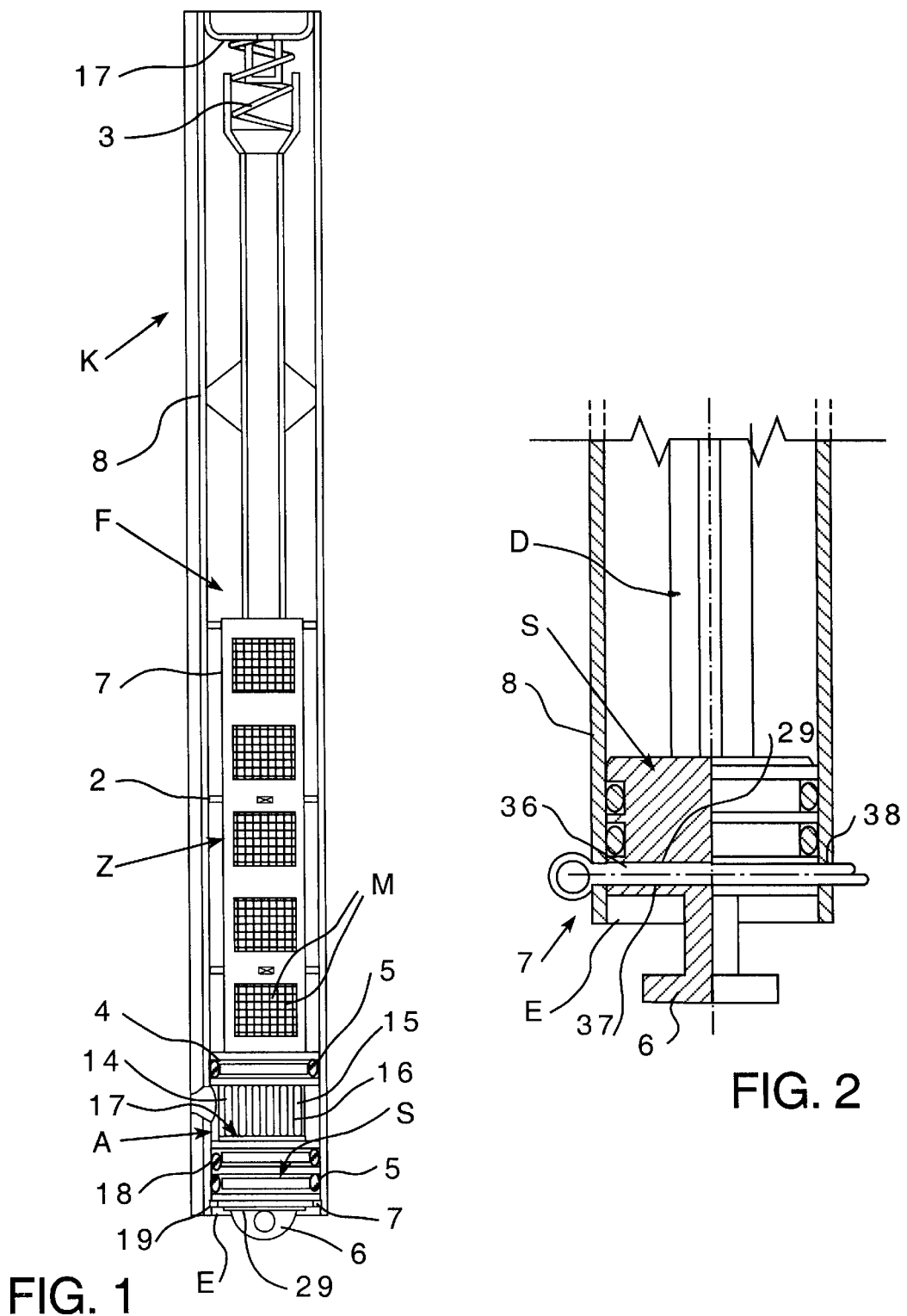

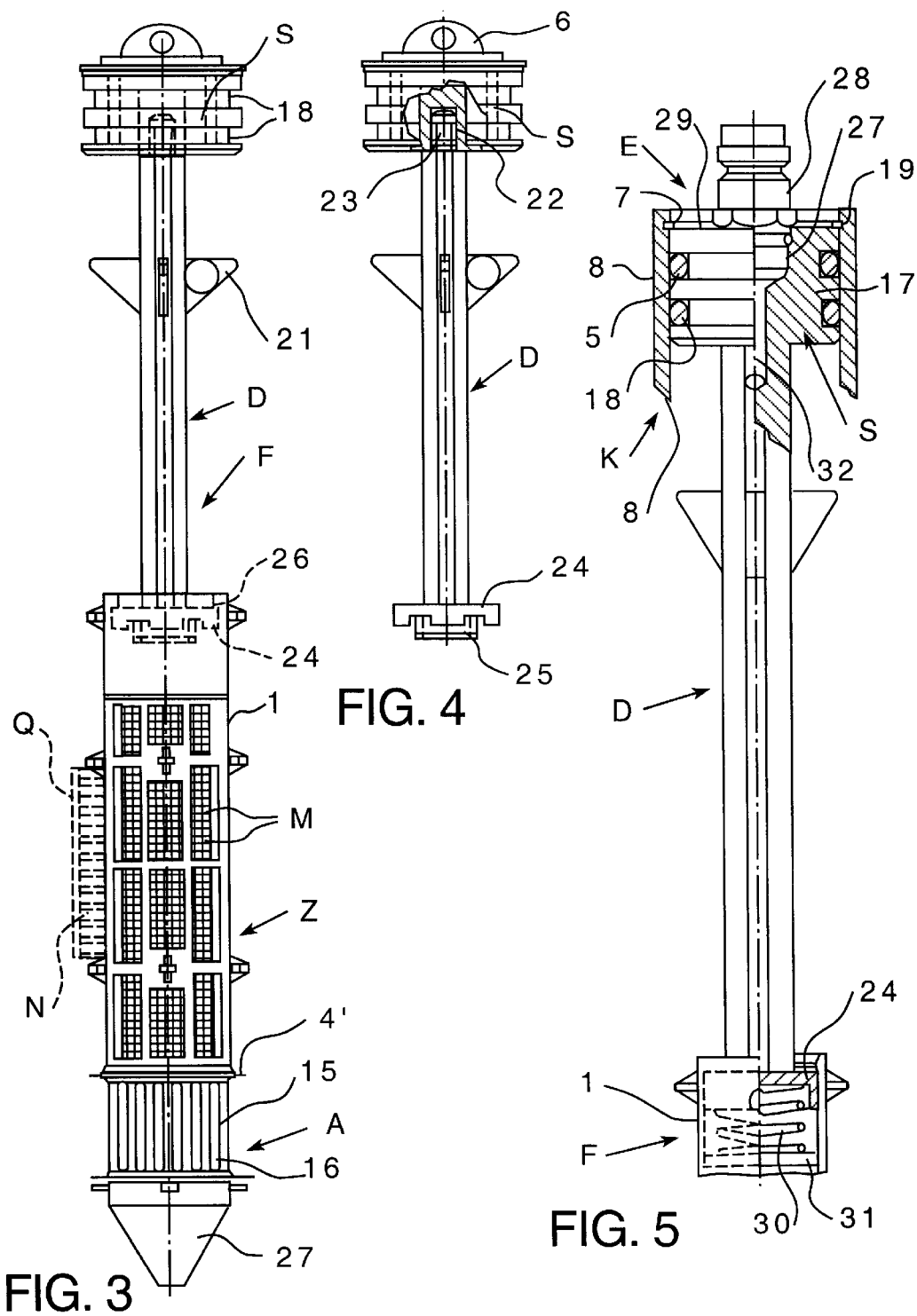

Figure 9:
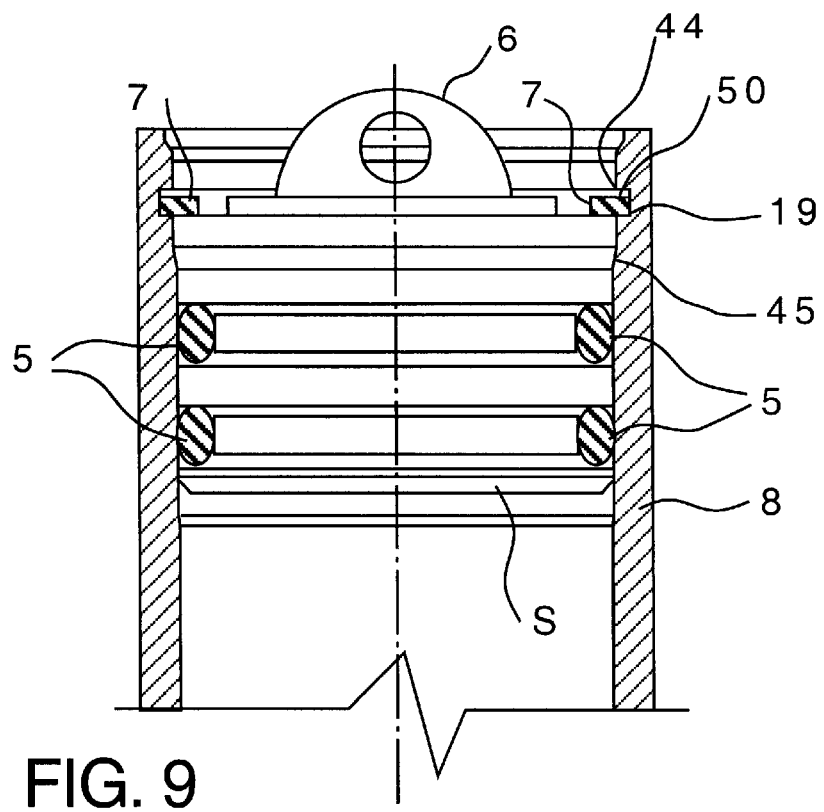

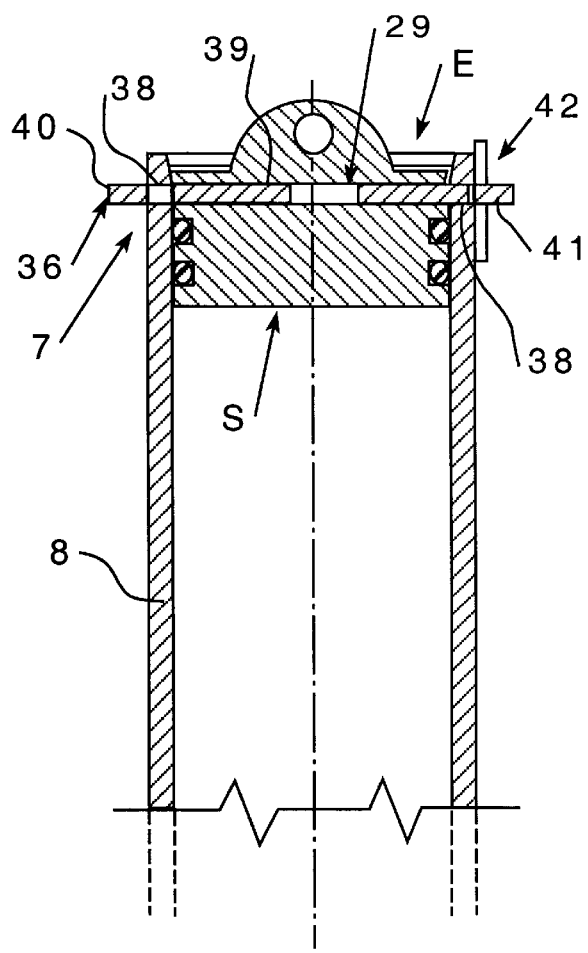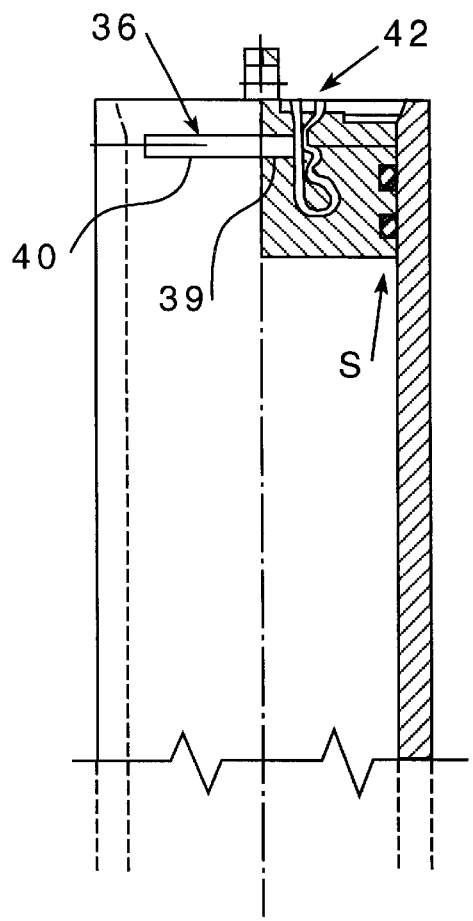
FIG. 6    FIG. 7
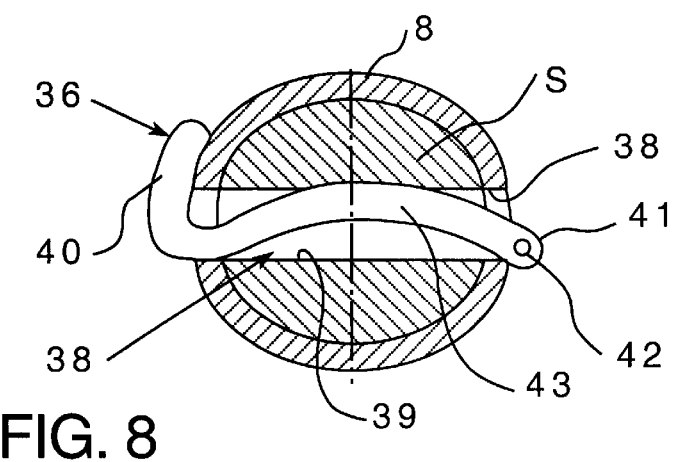
FIG. 8

FILTER CARTRIDGE AND CONDENSER

The invention relates to a filter cartridge according to the preamble part of claim 1 as well as to a condenser according to the preamble part of claim 13.

A filter cartridge as known from EP-A-0 669 506 is provided within a collecting tube or header pipe of the condenser and is sealed and positioned by means of a metallic plug screwed into the insertion opening of said tube. Since said filter cartridge is supported in its operating position under a certain axial load, it simultaneously is backed up by the plug. This is a conventional structural principle of filter cartridge equipped condensers. There is a relatively precisely machined and tight thread connection provided between the plug and the insertion opening. This is expensive. However, since the condenser or the condenser housing during manufacturing, e.g. during soldering, is thermally loaded relatively strong, without the filter cartridge positioned within the header pipe, deformations of the insertion opening might occur so that the plug cannot be screwed in easily later and might not be sufficiently tight. Moreover, further irregularities between the plug and the insertion opening at the threaded connection might result from unavoidable temperature variations and corrosion effects and varying mechanical loads during operation of the condenser. This makes its particularly complicated to remove the plug for a change of the filter cartridge after a long duration use of the condenser. Even if then the plug can be removed in a troublesome way it often cannot be used a second time. Also a new plug then does not fit properly into the insertion opening. This problem might cause expensive and time-consuming re-machining efforts.

It is a task of the invention to provide a filter cartridge as well as a condenser with a filter cartridge, as mentioned above, which are structurally simplified and which allow assembly and disassembly and an exchange of the filter cartridge in a comfortable way.

Said task can be achieved by the features contained in claim 1 and in view to the condenser by the features of claim 11.

Since the plug is a part of the filter cartridge a separate manufacturing of a proper plug is avoided. The plug is mounted in the insertion opening first when also the filter cartridge is inserted. The plug then hermetically seals the insertion opening against the outer environment. Simultaneously the plug takes care of the correct positioning of the cartridge. The plug does not need to be screwed-in so that a threaded connection sensitive to deformation is avoided. The plug, instead, can be pressed in axially and/or secured in position by simple fastening elements.

The dual function plug made from plastic material as or light metal forming a part of the filter cartridge offers the possibility of a simple and comfortable assembly of the cartridge into the condenser, since the plug is introduced or pressed into the header pipe together with the filter cartridge until the filter cartridge and the plug reach their respective and correct positions. The plug, particularly if it is made from plastic material, is able to adapt itself to the shape of the insertion opening, even if the insertion opening should have been de-formed during the thermal treatment of the condenser or condenser housing or de-forms during operation. The necessary tightness is assured permanently. Removal, e.g. for exchanging the filter cartridge, of the plug can be carried out comfortably. The plug seals the collector tube and positions the cartridge.

As the filter cartridge has to be secured in the long header pipe of the condenser in its correct operating position, it is expedient, to provide the filter cartridge with a spacer and to provide the plug directly at said spacer.

Said plug can be connected detachably with the spacer or can be formed unitary with the spacer e.g. from plastic material.

Expediently the plastic or light metal spacer comprising the plug is detachably connected to the housing of the filter cartridge.

In order to achieve a correct positioning of the filter cartridge it is of advantage to support the spacer in the housing of the filter cartridge in a yieldable fashion (to axially pre-load the cartridge).

In an alternative embodiment the plug is provided at the lower end of the housing of the filter cartridge. In this case this is a filter cartridge which is inserted through a lower insertion opening into the header pipe of the condenser and which is positioned by the plug.

In view to manufacturing it is of advantage if the plug is a cylindrical body of plastic material or light metal with in-built sealing grooves and a supporting element like a surface for a securing element Said plug is brought into its sealing position essentially only by axially pressing it into the insertion opening. Sealings provided in said grooves, preferably several O-rings, assure the necessary tightness. The supporting surface bears against the securing element such that the plug and by means of the plug also the filter cartridge remain properly positioned.

For an easy removal of the filter cartridge a gripping flap can be formed on the plug.

Alternatively or additionally a seat socket and a channel for a sensor and/or a charging valve can be formed in said plug, said socket receiving said sensor and/or charging valve.

The housing of the filter cartridge is equipped in the outlet zone with filter material having small pores the sizes of which suffice to retain even the smallest particles. To the contrary, the inlet zone is provided with micro-bores assuring a strong and uniform flow of the refrigerant towards the desiccant charge within the housing. Said micro-bores can be produced far less expensively in an injection mold than to mold a conventional cage-like housing portion. Said micro-bores can be formed by needle-like inserts in the injection mold and during the injection process of the housing. Expediently said needle-like inserts extend perpendicular to the mold separation plane such that they can be positioned stationarily within the form and are pulled out from the product when the mold halves are separated.

In another embodiment, the housing of the cartridge directly is connected to the plug. The housing has openings covered by molecular sieves, and may be provided with a separation sealing lip or O-ring. The desiccant charge is received in a flexible fabric or sieve bag connected to the housing and in flow connection with the interior of the housing.

Said filter cartridge can be assembled easily into the condenser and can be changed at any time through the insertion opening, irrespective where said opening is located. The plug as a part of the filter cartridge is provided at the respective end of the filter cartridge, and consists expediently of plastic material or light metal. The plug is positioned in the insertion opening by an essential axial pushing movement and does not need a threaded connection. The plug maintains its position with the help of the securing element positively engaging into the inner wall of the insertion opening. Said securing element hinders the plug to inadvertently move out from the insertion opening. Said securing element can be a Seeger-ring or C-ring which is available in different sizes and with low costs. Seeger-rings are easy to mount and remove and generate the necessary holding force for the plug in a positive fashion.

In another embodiment said securing element may be a clip or a locking pin extending from outside through said header pipe and said plug. Said securing element can be removed and mounted comfortably and establish a high degree of safety against accidental removable. Said clip or locking pin may be inserted into a lateral shaft provided in the plug such that the plug neither can be pressed inwardly nor can escape from the header pipe. Expediently said clip or locking pin has an insertion end and at its opposite end a holding end. Said holding end positively is supported at the outer side of the header pipe, while another safety element can be inserted into the protruding insertion end. Said safety element may be a spring ring or a spring clip or even a lock. The clip or locking pin can be made of metal or plastic material.

Expediently said clip is formed like an elastic tongue which is flat in lateral direction and has a width smaller than the width of the shaft in the plug and is formed with a bend such that it can be held under pre-load when inserted to more safely secure the plug in its position.

Another embodiment uses a bayonet system for securing the plug in its position. A guiding curve can be provided, e.g. at the inner side of the wall of the header pipe for an engaging element of the plug. In case that said guiding curve is U-shaped the bayonet provides a further safety aspect, because the plug has to be first pressed in for the removing rotation of the bayonet design. However, the plug only can be pressed in if there is no significant pressure within said header pipe. As long as there is residual pressure, the bayonet closure cannot be opened until the pressure has been vented in the conventional way. This protects the car mechanic or the car owner when trying to exchange the filter cartridge with the system under pressure.

Even with a securing ring, e.g. a C-ring, said safety aspect can be provided, assuring that the cartridge cannot be removed inadvertently as long as the system pressure is too high. For that function the header pipe may be formed with an inclined shoulder supporting the plug, and with an axial clearance in the seat groove for the C-ring. An outer counterstay shoulder of the groove is firmly contacted by the C-ring in case of considerable system pressure, hindering to remove the C-ring without first relieving the pressure.

Embodiments of the invention will be explained with the help of the drawing. In the drawing is:

FIG. 1 a longitudinal section of a part of a condenser with inserted filter cartridge, FIG. 2 a front view in enlarged scale and partially in sectional view of a securing element of the invention, FIG. 3 a front view of another embodiment of a filter cartridge, FIG. 4 a detail belonging to FIG. 3, FIG. 5 a part of a further embodiment of a filter cartridge in its operating position in a header pipe of a condenser, FIGS. 6, 7 & 8 three interrelated sections of another embodiment.

FIG. 9 a safety locking feature of the plug, and

Figure 10:
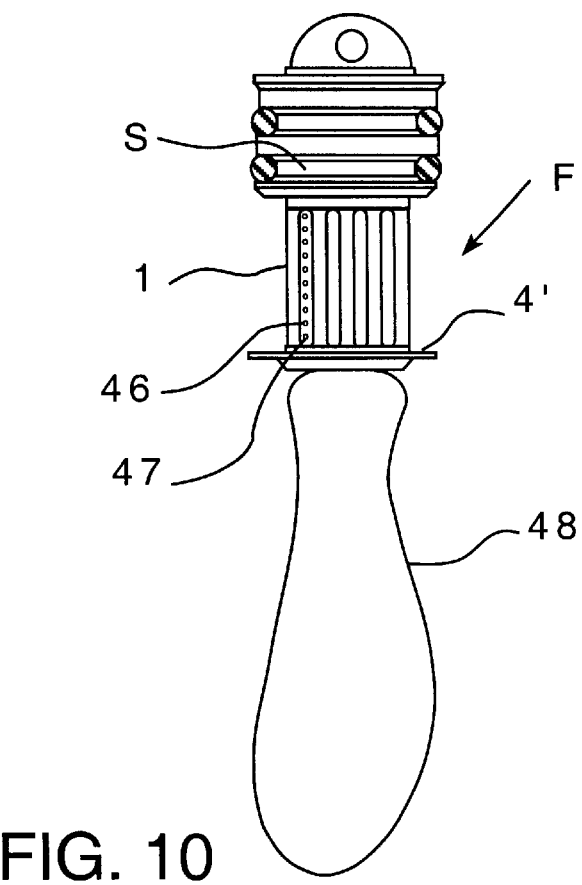

FIG. 10 another embodiment of a cartridge/plug assembly.

FIG. 1 shows a header pipe 8, e.g. a vertical header pipe, at one end of a condenser K, in a longitudinal section. In said header pipe 8 a filter cartridge F is positioned in its operating position. Said filter cartridge F contains inter alia a charge of a desiccant serving to extract water from the refrigerant circulating through the condenser water and also to retain particles contained in the refrigerant and a filter structure. Said filter cartridge F has a generally tube-shaped housing 1 with a permeable inlet filter zone Z and a permeable outlet filter zone A. In-between a ring flange 4 carrying at least one sealing element 5 serves as a separation wall co-operating with the header tube 8. Said housing 1 may have integrated spacing elements 2. Moreover, at the upper end of housing 1 a spacer 3, e.g. equipped with a spring element, is provided abutting at a cap 17 e.g. soldered into header pipe 8.

In this embodiment filter cartridge F is inserted into the header pipe from above through a downwardly facing insertion opening E. The filter cartridge is positioned in header pipe 8 by a plug S closing the header pipe insertion opening E. Plug S is made from plastic material or light metal and is part of the filter cartridge F. Plug S is pressed essentially linearly into said insertion opening E and is sealing with the help of O-rings 5. Plug S maintains its position thanks to a securing element 7 which positively is fixed in the mouth of insertion opening E. A gripping flap 6 can be formed a plug S.

Housing 1 has a plurality of micro-bores M in its inlet filter zone Z. Outlet openings 15 of the housing 1 in said outlet filter zone A even are covered by filter material 16 having very fine pores. The refrigerant, mainly in its liquid phase, enters header tube 8, and enters housing 1 through said micro-bores M. From the interior of housing 1 and after having passed at least the desiccant the refrigerant exits through the filter material 16 and leaves said header pipe 8 e.g. through a side opening 14.

FIG. 5 shows how securing element 7 is inserted into a groove 19 formed within insertion opening E. It abuts against a supporting element 29 e.g. a surface of plug S. Plug S has circumferential grooves 18 for O-rings 5.

Said micro-bores M expediently are formed during injection molding housing 1 and by means of needle-equipped inserts N (FIG. 3) in the injection mold Q. In case that said needles of said inserts N are oriented perpendicular to the separation plane of the injection mold the final injection molded product can be removed easily. This is simpler in view to production and the design of the injection mold than to form said inlet zone Z as a cage-like structure. Said plug S in FIG. 1 is either formed unitarily with housing 1 or is fixed thereto.

In FIG. 2 said securing element 7 is a clip, splint or locking pin 36 seated within channels 37, 38 provided in plug S and within the wall of header tube 8.

The filter cartridge F as shown in FIG. 3 is intended to be inserted into a header pipe (not shown in FIG. 3) from the upper end. The inlet zone Z of housing 1 is defined by a plurality of micro-bores M. Said inlet zone Z is separated from the outlet zone A by a sealing lip 4'. In order to position the housing 1 deep enough essentially within the liquid phase of the refrigerant in header pipe 8, a spacer D is connected to the housing 1. Said spacer D carries plug S at its end opposite to housing 1. Sidewardly oriented wings 21 on spacer D serve to center it within the header tube 8. Housing 1 is formed with an upper opening and an annular inner flange 26. A lower flange 24 of spacer D can be forced by resilient deformation past said annular flange 26 in order to connect the spacer D and the housing 1, e.g. after inserting the desiccant-charge.

According to FIG. 4 the plug S is designed with a lower threaded blind bore 22 into which a threaded protrusion 23 of spacer D is screwed. The lower flange 24 is positioned at spacer D by means of a locking nut 25.

In the embodiment of FIG. 5 the filter cartridge F is provided, similarly as in FIG. 3, with a lower housing 1 and an upper spacer D. Spacer D rests with its flange 24 on a compression spring 30 supported by a lid 31 within housing 1, such that housing 1 is preloaded downwardly in its working position, once spacer D and plug S are correctly positioned by securing element 7. Plug S is unitarily provided at the upper end of spacer D and is made from the same plastic material or light metal as the spacer. The plug is provided in an upper insertion opening E of header pipe 8 and is secured in its position without a threaded connection by securing element 7, e.g. a Seeger-ring, seated in a groove 19 in the mouth of insertion opening E. Securing element 7 abuts supporting surface 29 of plug S. In this embodiment plug S is provided with a socket 27 receiving a sensor and/or a charging valve 28. A channel 32 leads from socket 27 downwardly and into the header pipe 8.

During assembly of the filter cartridge F into header pipe 8 of the condenser K first the filter cartridge F is inserted until plug S has reached the proper position. Then securing element 7 is inserted. In order to change the filter cartridge the securing element 7 is removed and the filter cartridge then can be pulled out, e.g. by means of gripping flap 6.

In FIGS. 6, 7 and 8 securing element 7 is clip 36 of a special design inserted into openings 38 in the wall of the header pipe 8 and in a lateral shaft 39 formed within plug S and defining said supporting element 29. Both ends 40, 41 of said clip 36 protrude beyond the wall of header pipe 8. Said clip 36 can be made from metal or plastic and is designed as a flat, elastic tongue in FIG. 6 having, according to the view of FIG. 8, an arc-shaped bend 43. Since lateral shaft 39 is broader perpendicular to the axis of header pipe 8 than the width of clip 36, but the bend 43 is stronger than the width of the lateral shaft 39 the inserted clip 36 is pre-loaded. It is supported by said pre-load within openings 38 and at the wall of lateral shaft 39. Holding end 40, e.g. a sidewards bent end portion, abuts the outer side of header pipe 8. Insertion end 41 protruding at the opposite side receives safety element 42 (e.g. a spring ring or a spring clip as shown in FIG. 7) or even a lock preventing that clip 36 can be pulled out accidentally.

Said clip system can be manufactured with low cost, because e.g. the openings in the header pipe as well as the lateral shaft in the plug can be formed by pressing or injection molding.

In FIG. 9 the safety feature already mentioned is provided for securing element 7 formed as a C-ring seated by radial expansion in groove 19 of header pipe 8. Between groove 19 and said C-ring an axial clearance 50 is provided. The upper shoulder 44 of groove 19 serves as a counterstay surface for C-ring 7 as long as considerable system pressure presses the plug S upwardly. This hinders removal of the C-ring 7 and need to relieve the system pressure, and then to first move the plug S downwardly to clear the C-ring 7 in groove 19. The downward movement of plug S is limited by an internal inclined shoulder 45 of header pipe 8.

In FIG. 10 the plug S directly is connected to the housing 1, openings 46 of which may be covered by a molecular sieve 47. Housing 1 has a circumferential separation lip 4'. At the free end of housing 1 a flexible (fabric or sieve material) bag 48 is fixed which contains the desiccant charge.

What is claimed is:

1. A filter cartridge in a condenser, for an automobile air conditioning system, comprising a permeable housing and at least one desiccant charge, the housing being dimensioned for insertion through an insertion opening into a header pipe of said condenser, said insertion opening being closed by a plug characterized in that said plug and said filter cartridge are a unitary part and said plug is a generally cylindrical body made from plastic material or light metal comprising at least one circumferential groove for a sealing element and an axial supporting structure for a securing element to secure said plug in said insertion opening.

2. The filter cartridge as in claim 1, characterised in that said housing of the filter cartridge has a longitudinal spacer, and that said plug is provided at a free end of said spacer.

3. The filter cartridge as in claim 2, characterized in that said spacer is made from plastic material or light metal, and that said plug is made from plastic material or light metal and is unitarily provided at said spacer.

4. The filter cartridge as in claim 2, characterised in that said spacer is separable from said housing at its end opposite to said plug, and that said spacer is yieldably supported within said housing by means of a spring.

5. The filter cartridge as in claim 1, characterised in that said plug is provided at a lower end of said housing of said filter cartridge.

6. The filter cartridge as in claim 1, characterised in that a socket and an access channel for a sensor and/or a charging valve is provided within said plug, said socket removably receiveng said sensor and/or filling valve component.

7. The filter cartridge as in any one of the preceding claims, characterized in that said housing is separated into an inlet filter zone and an outlet filter zone both separated from one another by an annular flange, and that in said outlet filter zone a filter fabric element with fine pores is provided, while in said inlet filter zone micro-bores are formed in a wall of said housing.

8. The filter cartridge as in claim 7, characterised in that said micro-bores are formed by needle-shaped inserts in an injection mold for forming said housing.

9. The filter cartridge as in claim 1, characterised in that said housing defines an inlet or outlet filter structure for a fluid, said housing being connected at one end to said plug and at its other end to a fluid permeable bag receiving said desiccant charge.

10. A condenser, for an automobile air conditioning system, comprising a header pipe having an insertion opening, a filter cartridge removably positioned within said header pipe and containing a desiccant, and comprising a plug sealingly closing said insertion opening characterized in that said plug is made from plastic material or light metal and said plug and said filter cartridge are a unitary part, and said filter cartridge is secured within said insertion opening, which is upwardly facing or downwardly facing, by means of a securing element engaging into a wall of said insertion opening and abutting against an outer supporting element of said plug.

11. The condenser as in claim 10 characterised in that said securing element is a Seeger-ring seated in a groove of said insertion opening.

12. The condenser as in claim 10 characterised in that said securing element is a clip or locking pin extending from outside through the wall of said header pipe.

13. The condenser as in claim 12 characterised in that said supporting element is a lateral shaft formed within said plug for receiving said clip or locking pin.

14. The condenser as in claim 12 or 13, characterised in that said clip or locking pin has an insertion end and a holding end, said holding end being positively abutting an outer side of said header pipe, said insertion end where protruding beyond said header pipe receiving an additional safety element blocking said clip or locking pin against being pulled out.

15. The condenser as in claim 12, characterised in that said clip or locking pin is made from metal or plastic material.

16. The condenser as in claim 14, wherein said supporting element is a lateral shaft, characterised in that said clip or locking pin is formed as an elastic tongue with a width perpendicular to the axis of said header pipe being smaller than the width of said lateral shaft of said plug and having in a width direction an arc-shaped bend such that the inserted clip or locking pin is pre-loaded in a direction of said bend in openings of the wall of said header pipe and within said lateral shaft.

17. The condenser as in claim 12 characterised in that said securing element is a C-ring or Seeger-ring seated in a groove of said header pipe with an axial safety function clearance.

* * * * *